United States Patent [19]
Yagi et al.

[11] Patent Number: 5,717,751
[45] Date of Patent: Feb. 10, 1998

[54] TELEPHONE APPARATUS AND PRIVATE BRANCH EXCHANGE APPARATUS

[75] Inventors: Hisashi Yagi; Kouji Yamanishi, both of Fukuoka, Japan

[73] Assignee: Matsushita Electric Industrial Co., Ltd., Japan

[21] Appl. No.: 489,279

[22] Filed: Jun. 9, 1995

[30] Foreign Application Priority Data

Jun. 13, 1994 [JP] Japan .................. 6-130195

[51] Int. Cl.$^6$ .................................. H04M 11/00
[52] U.S. Cl. .................. 379/373; 379/93; 379/95; 379/377; 379/387; 379/413
[58] Field of Search ............... 379/373, 377, 379/375, 93, 98, 234, 156, 164, 165, 218, 200, 268

[56] References Cited

U.S. PATENT DOCUMENTS

| | | | |
|---|---|---|---|
| 5,361,296 | 11/1994 | Reyes et al. | 379/373 |
| 5,400,397 | 3/1995 | Ryu | 379/156 |
| 5,581,612 | 12/1996 | Nishikawa | 379/156 |

FOREIGN PATENT DOCUMENTS

| | | | |
|---|---|---|---|
| 2-283160 | 11/1990 | Japan . | |
| 2-283169 | 11/1990 | Japan | 379/373 |

*Primary Examiner*—Jack Chiang
*Assistant Examiner*—Jacques M. Saint-Surin
*Attorney, Agent, or Firm*—Rossi & Associates

[57] ABSTRACT

In addition to the conventional telephone portion, this telephone apparatus, coupled to a subscriber's (TEL) line coupled to an intercommunication (ICM) line, comprises a modulation circuit for modulating a data signal to have a frq band different from that used in the conventional telephone portion; a demodulation circuit for receiving/demodulating a modulated data signal having that frq band from another telephone apparatus connected to the same ICM line; and a control circuit for effecting communication with the TEL line and generating control data indicative of inhibition of using the TEL line and transmitting it as the data signal toward another telephone apparatus when the user responds a call or demodulation circuit does not receive modulated data signal indicative of inhibition of using the TEL line from another telephone apparatus. A busy tone may be supplied to the user when the user tries to use the TEL line if the control data is received by the demodulation circuit. Thus, if plural this type telephone apparatus are connected to the same ICM line, interference is prevented and each is alive in power fail because each has an interface. Further, ICM is provided with modulation signal through ICM line. A pbx having band-stop filters for preventing leaking of the ICM but transmitting control data to another ICM line is disclosed.

13 Claims, 4 Drawing Sheets

TELEPHONE APPARATUS AND PRIVATE BRANCH EXCHANGE APPARATUS

BACKGROUND OF THE INVENTION

1. Field of the Invention

This invention relates to a telephone apparatus communicating with a telephone line and an intercommunication line and a private branch exchange apparatus for connecting a plurality of telephone apparatus to at least one telephone line.

2. Description of the Prior Art

Two telephone system having two telephones and a switch box for connecting the telephones to a telephone line is known. The switch box connected to a telephone line having two output terminals and the outputs are connected two telephones respectively. When a ring signal arrives, one of these telephones off-hooked is connected to the telephone line and the other is disabled. This system is inconvenient because cables of these telephones should branch at the switch box.

A telephone apparatus having an extension communication (intercommunication) function comprising a main telephone having an interface portion for communication with a subscriber's (telephone) line and at least one extension telephone capable of communicating with the telephone line via the interface of the main telephone through the extension (intercommunication) line connected to the main telephone and communicating with the main telephone or another extension telephone through the extension line is known.

Another telephone apparatus is also disclosed in Japanese patent application provisional publication No. 2-283160. This telephone apparatus has a data transmission portion for transmitting and receiving data modulated with a carrier signal having a higher frequency than the voice frequency band and transmitted through a signal line with the voice signal and receives data with a separating circuit and demodulator for demodulating the received modulated data to reproduce the data.

SUMMARY OF THE INVENTION

The aim of the present invention is to provide an improved telephone apparatus and private branch exchange apparatus.

According to this invention, there is provided a first telephone apparatus comprising: a handset for reproducing a first sound signal and receiving a sound and producing a second sound signal; a ring signal detection circuit for detecting a ring signal from the subscriber's line and for informing a user of an arrival of a call; an interface circuit for receiving the first sound signal from a subscriber's line to which an intercommunication line is coupled and transmitting the second sound signal to the subscriber's line; an operation circuit for receiving an operation command; a transmitting and receiving circuit for transmitting control data indicative of inhibition of using the subscriber's line to the intercommunication line and receiving the control data from the intercommunication line; and a control portion for communicating with the subscriber's line using the interface circuit and generating and transmitting the control data to the intercommunication line using the transmitting and receiving circuit when the ring signal detection circuit informs the user of the arrival of the call and the user responds the call or when the operation circuit receives the operation command indicative of communicating with the subscriber's line and the transmitting and receiving circuit does not receive the control data.

According to this invention there is also provided a second intercommunication telephone apparatus comprising a plurality of telephone apparatus coupled to an intercommunication line respectively, each telephone apparatus having: a handset for reproducing a first sound signal within a first frequency band and receiving a sound and producing a second sound signal within the first frequency band; a ring signal detection circuit for detecting a ring signal from the subscriber's line and for informing a user of an arrival of a call; an interface circuit for receiving the first sound signal from a subscriber's line coupled to the intercommunication line and transmitting the second sound signal to the subscriber's line; a transmitting and receiving circuit for transmitting control data indicative of inhibition of using the subscriber's line to the intercommunication line and receiving the control data from the intercommunication line; a control portion for communicating with the subscriber's line using the Interface circuit and generating and transmitting the control data to the intercommunication line using the transmitting and receiving circuit when the ring signal detection circuit informs the user of the arrival of the call and the user responds the call or when the operation circuit receives the operation command indicative of communicating with the subscriber's line and the transmitting and receiving circuit does not receive the control data, wherein the transmitting and receiving circuit transmits the control data toward another one of the telephone apparatus and the transmitting and receiving circuit receives the control data from another one of the telephone apparatus.

In the first or second telephone apparatus, the handset reproduces the first sound signal and the second sound signal within a first frequency band and the transmitting and receiving circuit comprises: a modulation circuit for modulating a first data signal indicative of the control data to have a second frequency band and transmitting the first data signal to the intercommunication line, the first frequency band being different from the second frequency band; and a demodulation circuit for receiving a second data signal indicative of said control data having the second frequency band from the intercommunication line and demodulating the second data signal.

The first or second telephone apparatus, further comprises: a first power supply for receiving a first supply power from the subscriber's line and supplying the first supply power to the ring signal detection circuit, the interface circuit, and the operation circuit; a second power supply for generating a second supply power from an ac power and supplying the second supply power to the modulation and the demodulation circuit and the control portion; and a circuit for, when the second power supply is in power fall, operating the ring signal detection circuit, the interface circuit, the operation circuit to enable to communicate with the subscriber's line using the first supply power.

According to the present invention there is further provided a private branch exchange apparatus comprising: N terminals to be connected to subscriber's lines; M intercommunication terminals to be connected to intercommunication lines; a communication passage switching circuit for providing at least a communication passage between one of the N terminals and one of the M intercommunication terminals and between one of the M intercommunication terminals and another one of the M intercommunication terminals in response to a ring signal from either of the plurality of subscriber's lines or an operation from either of the intercommunication lines, M and N being natural numbers more than one; and band-stop filters, provided between the M intercommunication terminals and the communication passage switching circuit for transmitting a first sound signal having a first frequency band and a data signal having a second frequency band therethrough and stopping transmission of a second sound signal having a third frequency band therethrough, the second and third frequency ranges being higher than the first frequency range, the communication passage transmitting the first and second sound signals and the data signal, wherein the first sound signal and the data signal are transmitted through the communication passage switching circuit and the band-stop filters and the second sound signal used for intercommunication between a plurality of telephone apparatus connected to one of the M intercommunication lines is prevented to transmitting to another intercommunication line.

BRIEF DESCRIPTION OF THE DRAWINGS

The object and features of the present invention will become more readily apparent from the following detailed description taken in conjunction with the accompanying drawings in which.

The same or corresponding elements or parts are designated with like references throughout the drawings.

DETAILED DESCRIPTION OF THE INVENTION

Hereinbelow will be described a first embodiment of this invention.

Figure 1:
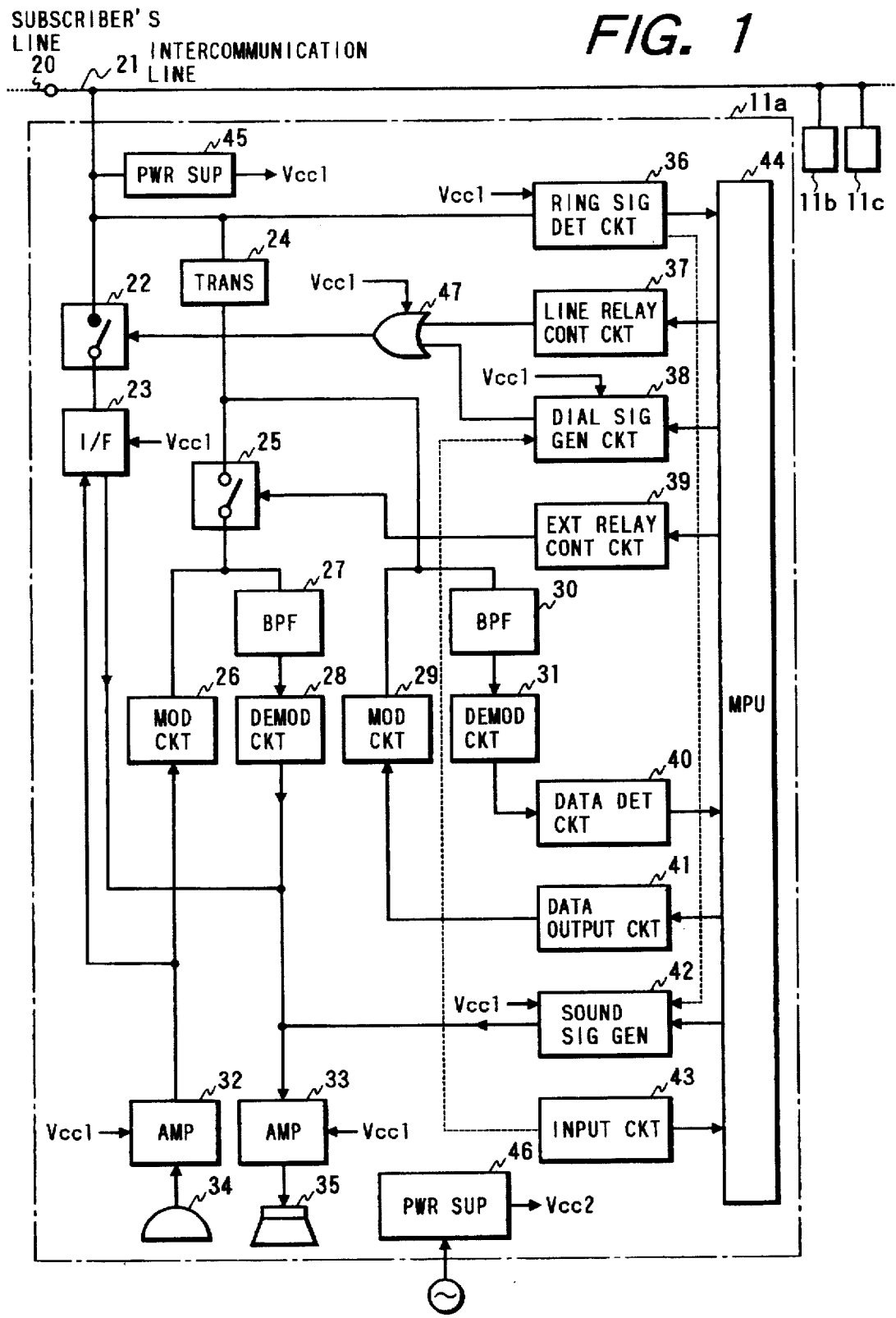
FIG. 1 is a block diagram of the telephone apparatus of this invention.

FIG. 1 is a block diagram of the telephone apparatus of this invention. In this embodiment, a subscriber's line 20 is connected to at least one telephone apparatus through an intercommunication line 21, that is, it connected to a first telephone apparatus 11a to third telephone apparatus 11c through the intercommunication line 21. Each of telephone apparatus comprises a ring signal detection circuit 36 for detecting a ring signal transmitted from an exchange through a subscriber's (telephone) line 20 and the extension line 21 connected to the subscriber's line 20, an interface circuit 28 for communicating with the extension line 21, a line relay 22 for connecting the interface circuit 23 to and disconnecting the interface circuit 23 from the extension line 21, a microphone 34 for receiving a sound or a voice of the user and supplying a voice signal to the interface via an amplifier 32, etc., a speaker 35 for reproducing a voice signal from the exchange via the line relay 22, etc., the interface circuit 23, and an amplifier 33, a microprocessor 44 for receiving a ring signal detection signal from the ring signal detection circuit 36, and controlling the line relay 22, or the like, a transformer 24 for a high frequency coupling to the extension line 21, a modulation circuit 26 for modulating the voice signal from the microphone 34 via the amplifier 32, an extension relay 25 for connecting an output of the modulation circuit 26 to the transformer 24, the extension relay 25 being controlled by the microprocessor 44 via an external relay control circuit 39, a band pass filter 27 for extracting a modulated voice signal from signals from the extension line via the transformer 24 and the extension relay 25, a demodulation circuit 28 for demodulating the sound signal from the extension line via the transformer 24 and supplying a demodulated sound signal to the speaker 35 via the amplifier 33, a data outputting circuit 41 for outputting data under the control of the microprocessor 44, a modulation circuit 29 for modulating the data from the data outputting circuit 41 and supplying the modulated data to the extension line 21 via the transformer 24, a band pass filter 30 for extracting a modulated data signal from the signals from the extension line 21 via the transformer 24, and a demodulator 31 for demodulating the modulated data signal from the band pass filter 30, a data detection circuit 31 for detecting data from the demodulated data signal from the demodulation circuit 31 and supplying the detected data to the microprocessor 44, a line relay control circuit 37 for generating supplying a relay control signal via an OR circuit 47 under the control of the microprocessor 44, a dial signal generation circuit 38 for generating a dial pulse control signal through the OR circuit 47 to the line relay 22 to generate and supply the dial pulse signal to the exchange through the subscriber's line 20, a sound signal generation circuit 48 for generating a sound signal such as a ring sound and a busy tone sound under the control of the microprocessor 44 to supply the sound signal to the speaker 35 via the amplifier 33 to generate an information sound, an input circuit having a twelve keys, an off hook switch, and other operation keys for dialing, effecting an off/on hook operation, an extension communication or the like, the line relay control circuit 37 for controlling the line relay 22 and the extension relay control circuit 39 being controlled respectively by the microprocessor 44.

Figure 2:
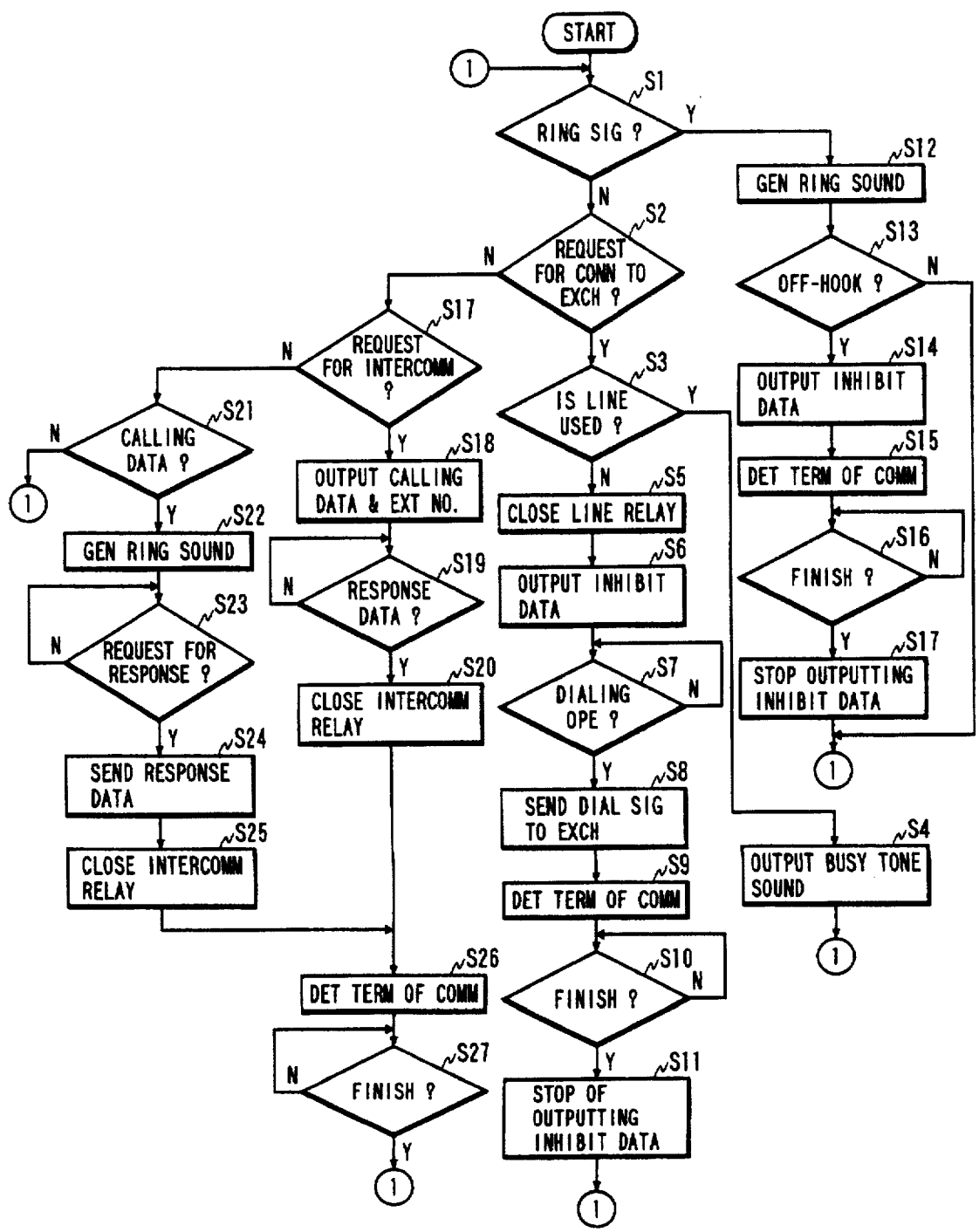
FIG. 2 is a diagram of a flow chart of the operation of the telephone apparatus of this invention.

Operation of the first embodiment will be described. FIG. 2 is a diagram of a flow chart of the operation of the telephone apparatus. The microprocessor 44 executes a processing represented by the flow chart shown in FIG. 2 in accordance with a program stored therein.

During a standby condition, processing loops through steps s1, s2, s17, and s21 because in step s1 a decision is made as to whether there is a ring signal and the answer is NO, in step s2 a decision is made as to whether there is a request for connection to the exchange and the answer is NO, in step s17, a decision is made as to whether there is a request for intercommunication with another extension telephone and the answer is NO, and in step s21, a decision is made as to whether there is calling data and the answer is NO.

When the user calls a partner at an outside location, that is, the user desires to connect the line to the exchange the user executes the off-hook operation and a dial inputting operation for calling the partner at the outside location. Therefore, in step s2, the processing branches,off to step s3. In step s3, the microprocessor 44 makes a decision as to whether the subscriber's line is used by another telephone apparatus 11a or 11c connected to the same intercommunication line 21. If the subscriber's line is in a busy state by checking whether the inhibit data indicative of inhibition of using the subscriber's line or indicating the subscriber's line is used is received by the data detection circuit 40, the microprocessor 44 makes a busy sound using the sound signal generation portion 42. If the subscriber's line is not in the busy state, the microprocessor 44 closes the line relay 22 in step s5 using the line relay control circuit 87. Then, the microprocessor 44 supplies inhibit data to the intercommunication line 21 using the data output circuit 41, the modulation circuit 29 and the transformer 24. In step s7, if there is a dialing operation, the microprocessor 44 sends a dial signal to the exchange in step s8 using the dial signal generation circuit 38. In step s9, the microprocessor 44 detects the termination of the communication. In step s10, if the communication has finished, the microprocessor 44 stops supplying of the inhibit data to the intercommunication line 21 in step s11 and processing returns to step s1.

When there is a call from the exchange, the ring signal detection circuit 36 detects the ring signal from the exchange. Therefore, in step s1 processing branches off to step s12 and the microprocessor 44 generates a ring sound using the sound generation portion 42. In the following step s13, the microprocessor 44 makes a decision as to whether there is an off-hook operation. If there is off-hook operation in step s13, the microprocessor 44 supplies the inhibit data to inform another telephone apparatus 11b and 11c that the subscriber's line 20 is used. Then, a communication is made possible. In the following step s15, the microprocessor 44 detects the termination of the communication. In step s16, if the communication has finished, the microprocessor 44 stops supplying of the inhibit data to the intercommunication line 21 in step s17 and processing returns to step s1. In step s13, if there is no off-hook operation, processing returns to step s1.

Figure 3:
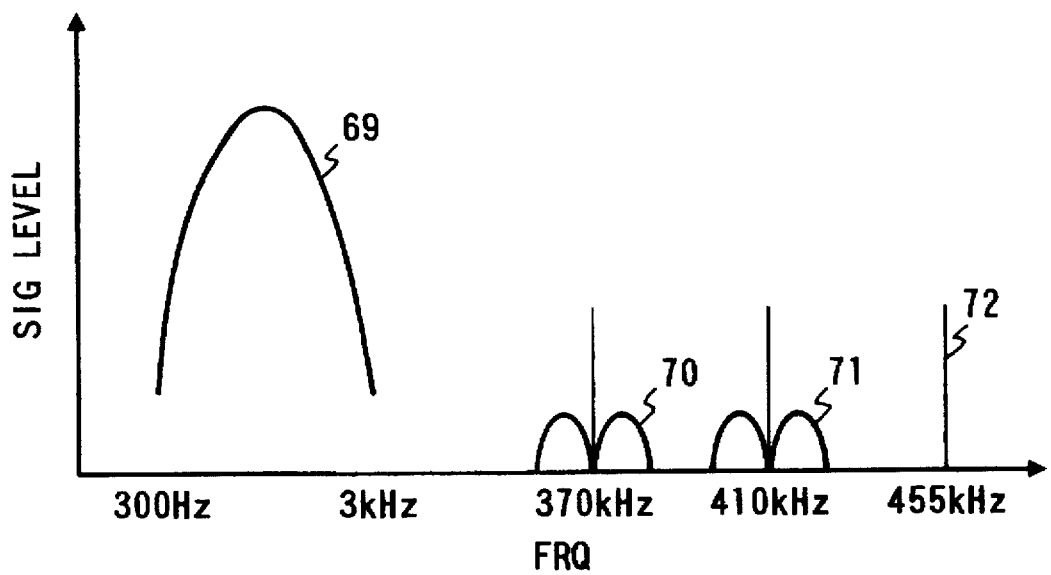
FIG. 3 is a graphic diagram of this invention showing a frequency relation between a sound signal for communication with the subscriber's line, sound signals used for intercommunication between the first and second telephone apparatus, and a data signal.

Prior to describing the operation of an intercommunication, the structure for the intercommunication will be described more specifically. FIG. 3 is a graphic diagram of this invention showing a frequency relation between a sound signal for communication with the subscriber's line 20 and carrier signals used for intercommunication between the first, second, and third telephone apparatus 11a, 11b, and 11c. A frequency characteristic curve 69 shows a frequency band of the sound signal directly communicated between the microphone 32 and speaker 35 and the exchange through the interface circuit 23 and the subscriber's line 20 because modulation is not necessary. Frequency characteristic curves 70 and 71 show frequency bands of modulated signals used for the intercommunication. When the telephone apparatus 11a sends a sound signal to the second telephone apparatus 11b having the same structure as the telephone apparatus 11a, the sound signal from the microphone 34 is amplified by the amplifier 32 and modulated by the modulation circuit 26 to have the frequency band 70 having the center frequency 370 KHz and supplied to the intercommunication line 21 through the transformer 24. The bandpass filter 27 of the second telephone apparatus 11b extracts the modulated sound signal from the intercommunication line through the transformer 24 of the second telephone apparatus 11b by the demodulation circuit 28 of the second telephone apparatus 11b. The amplifier 33 and the speaker 35 of the second telephone apparatus 11b reproduce the sound signal. On the other hand, the second telephone apparatus 11b transmits the sound signal to the first telephone apparatus 11a through the intercommunication line 21 by the modulation circuit 26 of the second telephone apparatus 11b with the frequency band 71 and the first telephone apparatus 11a receives the sound signal from the telephone apparatus 11b by the demodulation circuit 28 of the first telephone apparatus 11a with respect to the frequency band 71 having a center frequency 410 KHz. That is, during the intercommunication, there are two channels of communication provided which are frequency shifted from the non-modulated sound signal.

Therefore, the collisions between the sound signals from the first telephone apparatus 11a to the second telephone apparatus 11b and the second telephone apparatus 11b to the first telephone apparatus 11a are prevented. The frequency bands of each telephone apparatus for transmitting and receiving the sound signals may be exchanged between these frequency bands 70 and 71 in accordance with the occasion. Moreover, if the intercommunication is made between the second telephone apparatus 11b and the third telephone apparatus 11c, the collision between the intercommunication and the communication between the first telephone apparatus 11a and the partner at the outside location is prevented because the frequency bands used are different each other.

Return to FIG. 2, when the user of the telephone apparatus 11a operates the input circuit 48 to request the intercommunication with the second telephone apparatus 11b, the processing in the standby condition branches off to step s18 from the step s17. In the following step s18, the microprocessor 44 outputs calling data indicative of the extension number using the data output circuit 41 and the modulation circuit 29. The modulation circuit modulates the calling data indicative of the second telephone apparatus 11b to a modulated calling data having a frequency band 72 having a center frequency 455 KHz. The second telephone apparatus 11b in the standby condition receives the modulated calling data by the transformer 24 and the band pass filter 30 of the second telephone apparatus 11b and demodulates the received modulated calling data by the demodulation circuit 31 of the second telephone apparatus 11b. The microprocessor 44 of the second telephone apparatus 11b detects the calling data from the first telephone apparatus 11a through the data detection circuit 40. If the calling data directs the second telephone apparatus 11b, processing in the microprocessor 44 of the second telephone apparatus 11b branches off from the step s21 to step s22. The microprocessor 44 of the second telephone apparatus 11b generates a ring sound using the sound signal generation circuit 43 and the amplifier and the speaker 35 in step s22 and detects a request for a response by detecting the off-hook of the second telephone apparatus 11b in step s23. In the following step s24, the microprocessor 44 of the second telephone apparatus 11b sends response data to the first telephone apparatus 11a using the data output circuit 41, the modulation circuit 29 of the second telephone apparatus 11b through the intercommunication line and in step s25 closes the intercommunication relay 25 of the second telephone apparatus 11b.

On the other hand, the microprocessor 44 of the first telephone apparatus 11a detects the response data from the first telephone apparatus 11b using the bandpass filter 30, and the demodulation circuit 31 and if there is the response data, the microprocessor 44 of the first telephone apparatus 11a closes the intercommunication relay 25 in step s20. Therefore, the intercommunication between the first and second telephone apparatus 11a and 11b mentioned above is enabled.

After transmission of the response data by the microprocessor 44 of the second telephone apparatus 11b, the microprocessor 44 of the second telephone apparatus 11b detects the termination of the communication in step s26 and in step s27, if the communication has finished, processing returns to step s1. Similarly, the microprocessor 44 of the first telephone apparatus 11b detects the termination of the communication in step s26 and in step s27, if the termination has finished, processing returns to step s1.

A first group of the circuits of the telephone apparatus of this invention is supplied with a first supply power Vcc1 derived from the exchange through the subscriber's line 20 by a power supply circuit 45 and the second group of the circuits are supplied with a second supply power Vcc2 generated by a second power supply 46 from an ac line. Though the second supply power Vcc2 is in power fail, the ring signal detection circuit 36, the interface circuit 23, the amplifier 32 and 33, the dial signal generation circuit 38, and the OR circuit 47 are kept alive because supplying of the first supply power 1s kept. The dial signal generation circuit 38 directly controlled by the input circuit having dial keys. Therefore, in the power fail in the ac line or the power fail in the second power supplying circuit 46, it is possible that any one of the telephone apparatus 11a to 11c communicates with a partner at the outside location because the first group of the circuit as the basic circuit are alive. When there is a ring signal in power fail of the ac line, the ring signal detection circuit detects the ring signal and directly control the sound signal generation circuit 42 to reproduce the ring sound.

Figure 4:
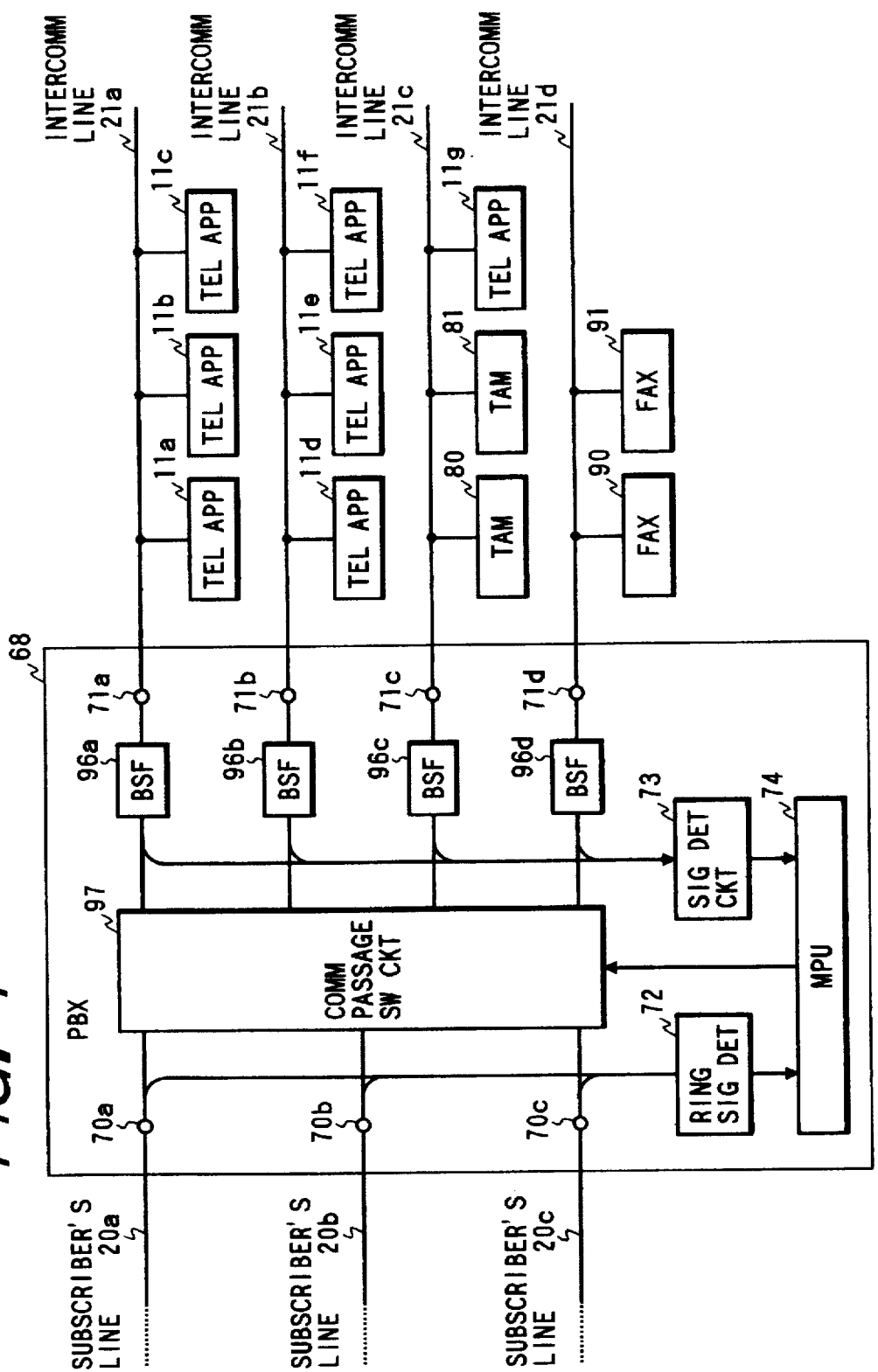
FIG. 4 is a block diagram of a private branch exchange apparatus of the second embodiment.

A second operation will be described. FIG. 4 is a block diagram of a private branch exchange (PBX) apparatus having a plurality of terminals of subscribers lines and a plurality of intercommunication terminals of intercommunication lines. The private branch exchange apparatus 68 comprises a plurality of line terminals 70a to 70c, a communication passage switching circuit 97, a plurality of intercommunication line terminals 71a to 71d, a plurality of band-stop filters 96a to 96d, a ring signal detection circuit 72 for detecting ring signal from subscriber's lines 20a to 20c respectively, a signal detection circuit 73 for detecting signal conditions of intercommunication lines and dial signals respectively, and a microprocessor 74 for controlling the communication passage switching circuit 97. The subscriber's lines 20a to 20c are connected to the communication passage switching circuit 97 through the terminals 70a to 70d respectively. The intercommunication lines 21a to 21d are connected to the private branch exchange 68 through terminals 71a to 71d and the band-stop filters 96a to 96d respectively. The ring signal circuit 72 detects a ring signal from the subscriber's line 20a to 20c and supplies it to the microprocessor 74. The signal detection circuit detects a off hook condition and a dialing operation from intercommunication lines 21a to 21d. The microprocessor 74 controls the communication passage switching circuit 97 in accordance with a predetermined operation.

When the signal detection circuit 73 detects a off-hook condition from each of intercommunication lines 21a to 21d and when it detects the off-hook condition, it supplies a off-hook condition signal to the microprocessor 74. In response to this,the microprocessor 74 controls the communication passage switching circuit 97 to form a communication passage between the intercommunication line where the off-hook condition occurs and one of the subscriber's lines 20a to 20c. For example, when the microprocessor 74 detects the off-hook condition and a first portion of the dial signal and if the first dial signal is for a call toward a partner at the outside location, the microprocessor 74 forms a communication passage between the intercommunication line in off-hook condition and one of the subscriber's lines and then the second portion of dial signal is supplied to the subscriber's line.

On the other hand, there is a case where a call is made toward the telephone apparatus connected to another intercommunication line. If there is a call from one of the telephone apparatus and the dial signal is for a call toward one of the telephone apparatus connected to another intercommunication line, the microprocessor 74 detects a first portion of the dial signal indicative of the destination intercommunication line number and forms a communication passage between the intercommunication line and the destination intercommunication line in accordance with the first portion. The above-mentioned structure and the operation are the same as the conventional private branch exchange except the band pass filters 96a to 96d.

The bandpass filters 96a to 96d are provided for preventing transmission of modulated sound signal having the passbands 70 and 71 from one intercommunication line to another intercommunication lines respectively but for transmitting the sound signals not modulated, dial signals having the frequency band 69, and the control data signal having the frequency band 72 in both directions. On the other hand, the communication passage formed in the private branch exchange has the frequency band including the frequency bands 69, 70, 71, and 72.

Then the telephone apparatus making the call sends the control data indicative of one of the telephone apparatus connected to the destination intercommunication line as the modulated data signal having the passband having the center frequency 72 which is allowed to pass through the band-stop filters 96a to 96d. Then, the called telephone apparatus responds the call and supplies the inhibit data to the destination intercommunication line to which the telephone apparatus is connected to prevent the other telephone apparatus from responding. Therefore, the calling telephone connected to the first intercommunication line can communicate with the called telephone connected to the second intercommunication line without a collision with the call or access from the other telephone apparatus connected to the second communication line.

Figure 5:
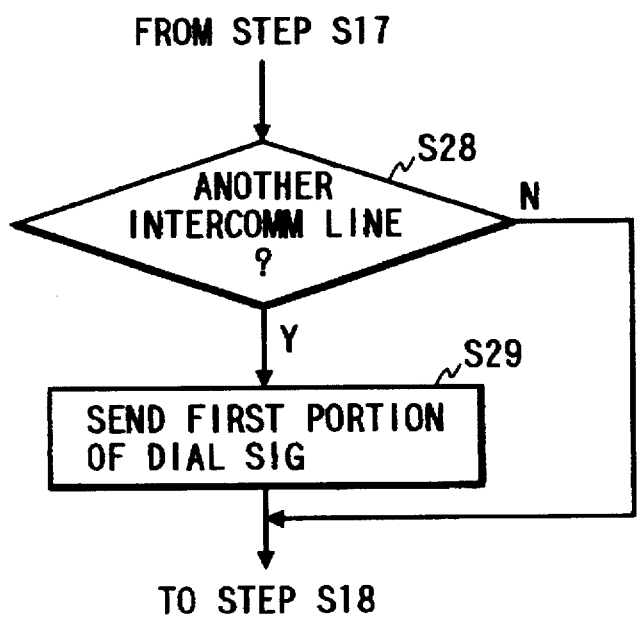
FIG. 5 is a diagram of a flow chart of the second embodiment.

FIG. 5 is a diagram of a flow chart of the second embodiment. This flow chart is inserted between the step s17 and step s18 in FIG. 2 and other operation of the telephone apparatus is the same as the first embodiment. If a first telephone apparatus 11a connected to the intercommunication line 21a calls a fourth telephone apparatus 11d, having the same structure as the first telephone apparatus 11a, connected to the intercommunication line 21b, in step s17 in FIG. 2, the first telephone apparatus 11a receives the request for the intercommunication. In step s28, if the request is for the another intercommunication line, that is, the intercommunication line 21b, the microprocessor 44 of the first telephone apparatus 11a sends the first portion of the dial signal to the private branch exchange 68. The private branch exchange 68 receives the first portion of the dial signal and forms the communication passage between the inter communication lines 21a and 21b. Then, in step s29, the microprocessor 44 of the first telephone apparatus 11b outputs the calling data and extension number data to the intercommunication line 21b through the band-stop filter 96a, and the band-stop filter 96b, and the communication passage between the intercommunication lines 21a and 21b in step s18. Then, the fourth telephone apparatus 11d receives the calling data and the extension number data and responds the call because the extension number data indicates the fourth telephone apparatus. In step s28, if the call is for the same intercommunication line, processing directly proceeds to step s18 as similar to the first embodiment.

In this embodiment, telephone apparatus 11a to 11c having the same structure as the telephone apparatus of the first embodiment are connected to the same intercommunication line 21a. A second intercommunication line 21b are connected to the telephone apparatus 11d to 11f and a third intercommunication line 21c is connected to telephone apparatus 80 and 81 having the same structure as the telephone apparatus 11a of the first embodiment and further automatic answering functions. The fourth intercommunication line 21d is connected to the telephone apparatus 90 and 91 having the same structure as the telephone apparatus 11a and further having facsimile functions respectively. That is, all telephone apparatus has the modulation circuits 26 and 29 and demodulation circuits 28 and 80. Therefore, these telephone apparatus 11a to 11g and 80, 81, 90, and 91 can perform the intercommunication communication between one of the intercommunication lines to another intercommunication line.

This private branch exchange apparatus can controls a more terminals than the number of the intercommunication terminals because the intercommunication in the same intercommunication line does not provide a load to the private branch exchange apparatus 68.

What is claimed is:

1. A telephone apparatus comprising:

a handset for reproducing a first sound signal and receiving a sound and producing a second sound signal;

a ring signal detection circuit for detecting a ring signal from a subscriber's line and for informing a user of an arrival of a call;

an interface circuit for receiving said first sound signal from said subscriber's line to which an intercommunication line is coupled and transmitting said second sound signal to said subscriber's line;

an operation circuit for receiving an operation command; and a transmitting and receiving circuit for transmitting control data indicative of inhibition of using said subscriber's line to said intercommunication line and receiving said control data from said intercommunication line; and control means for communicating with said subscriber's line using said interface circuit and generating and transmitting said control data to said intercommunication line using said transmitting and receiving circuit when said ring signal detection circuit informs said user of said arrival of said call and said user responds said call or when said operation circuit receives said operation command indicative of communicating with said subscriber's line and said transmitting and receiving circuit does not receive said control data.

2. A telephone apparatus as claimed in claim 1, wherein said handset reproduces said first sound signal and said second sound signal within a first frequency band and said transmitting and receiving circuit comprises:

a modulation circuit for modulating a first data signal indicative of said control data to have a second frequency band and transmitting said first data signal to said intercommunication line, said first frequency band being different from said second frequency band; and a demodulation circuit for receiving a second data signal indicative of said control data having said second frequency band from said intercommunication line and demodulating said second data signal.

3. A telephone apparatus as claimed in claim 2, wherein said modulation circuit transmits said first data signal toward another said telephone apparatus which may be connected to said intercommunication line and said demodulation circuit receives said second data signal from said another telephone apparatus.

4. A telephone apparatus as claimed in claim 2, further comprising:

a second modulation circuit for modulating said second sound signal to have a third frequency band and transmitting said modulated second sound signal to said intercommunication line, said third frequency band being different from said first and second frequency bands; and a second demodulation circuit for receiving a third sound signal having a fourth frequency band from said intercommunication line, demodulating said third sound signal to have said first frequency band, and supplying said second sound signal demodulated to said handset as said first sound signal to be reproduced, said fourth frequency band being different from said first to third frequency bands.

5. A telephone apparatus as claimed in claim 1, further comprising a busy tone sound signal generation circuit for generating and supplying a busy tone sound signal to said handset as said first sound signal to inform a user that said subscriber's line is in busy when said operation circuit receives said operation command indicative of communicating with said subscriber's line and said transmitting and receiving circuit receives said control data.

6. A telephone apparatus as claimed in claim 1, further comprising:

a first power supply for receiving a first supply power from said subscriber's line and supplying said first supply power to said ring signal detection circuit, said interface circuit, and said operation circuit;

a second power supply for generating a second supply power from an ac power and supplying said second supply power to said transmitting and receiving circuit and said control means; and means for, when said second power supply is in power fail, operating said ring signal detection circuit, said interface circuit, said operation circuit to enable to communicate with said subscriber's line using said first supply power.

7. An intercommunication telephone apparatus comprising a plurality of telephone apparatus coupled to an intercommunication line respectively, each telephone apparatus having:

a handset for reproducing a first sound signal within a first frequency band and receiving a sound and producing a second sound signal within said first frequency band;

a ring signal detection circuit for detecting a ring signal from a subscriber's line and for informing a user of an arrival of a call;

an interface circuit for receiving said first sound signal from said subscriber's line coupled to said intercommunication line and transmitting said second sound signal to said subscriber's line;

a transmitting and receiving circuit for transmitting control data indicative of inhibition of using said subscriber's line to said intercommunication line and receiving said control data from said intercommunication line; and control means for communicating with said subscriber's line using said interface circuit and generating and transmitting said control data to said intercommunication line using said transmitting and receiving circuit when said ring signal detection circuit informs said user of said arrival of said call and said user responds said call or when said operation circuit receives said operation command indicative of communicating with said subscriber's line and said transmitting and receiving circuit does not receive said control data, wherein said transmitting and receiving circuit transmits said control data toward another one of said telephone apparatus and said transmitting and receiving circuit receives said control data from said another one of said telephone apparatus.

8. A telephone apparatus as claimed in claim 7, wherein said handset reproduces said first sound signal and said second sound signal within a first frequency band and said transmitting and receiving circuit comprises:

a modulation circuit for modulating a first data signal indicative of said control data to have a second frequency band and transmitting said first data signal to said intercommunication line, said first frequency band being different from said second frequency band; and a demodulation circuit for receiving a second data signal indicative of said control data having said second frequency band from said intercommunication line and demodulating said second data signal.

9. An intercommunication telephone apparatus as claimed in claim 8, wherein each of said telephone apparatus further comprises:

a second modulation circuit for modulating said second sound signal to have a third frequency band and transmitting said modulated second sound signal to said intercommunication line, said third frequency band being different from said first and second frequency bands; and a second demodulation circuit for receiving a third sound signal having a fourth frequency band from said intercommunication line, demodulating said third sound signal to have said first frequency band, and supplying said second sound signal demodulated to said handset as said first sound signal to be reproduced, said fourth frequency band being different from said first to third frequency bands.

10. An intercommunication telephone apparatus as claimed in claim 7, wherein each of said telephone apparatus further comprises a busy tone sound signal generation circuit for generating and supplying a busy tone sound signal to said handset as said first sound signal to inform a user that said subscriber's line is in busy when said operation circuit receives said operation command indicative of communicating with said subscriber's line and said transmitting and receiving circuit receives said control data.

11. An intercommunication telephone apparatus as claimed in claim 7, wherein each of said telephone apparatus further comprises:

a first power supply for receiving a first supply power from said subscriber's line and supplying said first supply power to said ring signal detection circuit, said interface circuit, and said operation circuit;

a second power supply for generating a second supply power from an ac power and supply said second supply power to said transmitting and receiving circuit and said control means; and means for, when said second power supply is in power fail, operating said ring-signal detection circuit, said interface circuit, said operation circuit to enable to communicate with said subscriber's line using said first supply power.

12. A telephone apparatus comprising:

a handset for reproducing a first sound signal within a first frequency band and receiving a sound and producing a second sound signal within said first frequency band;

a ring signal detection circuit for detecting a ring signal from a subscriber's line and for informing a user of an arrival of a call;

an interface circuit for receiving said first sound signal from said subscriber's line to which an intercommunication line is coupled and transmitting said second sound signal to said subscriber's line;

a modulation circuit for modulating a first data signal to have a second frequency band and transmitting said data signal to said intercommunication line, said first frequency band being different from said second frequency band;

a demodulation circuit for receiving a second data signal having said second frequency band from said intercommunication line and demodulating said second data signal;

an operation circuit for receiving an operation command; and control means for communicating with said subscriber's line using said interface circuit and generating control data indicative of inhibition of using said subscriber's line and transmitting said control data as said first data signal to said intercommunication line using said modulation circuit when said ring signal detection circuit informs said user of said arrival of said call and said user responds said call or when said operation circuit receives said operation command indicative of communicating with said subscriber's line and said demodulation circuit does not receive said second data signal indicative of said inhibition of using said subscriber's line.

13. An intercommunication telephone apparatus comprising a plurality of telephone apparatus coupled to an intercommunication line respectively, each telephone apparatus having:

a handset for reproducing a first sound signal within a first frequency band and receiving a sound and producing a second sound signal within said first frequency band;

a ring signal detection circuit for detecting a ring signal from a subscriber's line and for informing a user of an arrival of a call;

an interface circuit for receiving said first sound signal from said subscriber's line connected to said intercommunication line and transmitting said second sound signal to said subscriber's line;

a modulation circuit for modulating a first data signal to have a second frequency band and transmitting said data signal to said intercommunication line, said first frequency band being different from said second frequency band;

a demodulation circuit for receiving a second data signal said second frequency band from said intercommunication line and demodulating said second data signal;

an operation circuit for receiving an operation command; and control means for communicating with said subscriber's line using said interface circuit and generating control data indicative of inhibition of using said subscriber's line and transmitting said control data as said first data signal to said intercommunication line using said modulation circuit when said ring signal detection circuit informs said user of said arrival of said call and said user responds said call or when said operation circuit receives said operation command indicative of communicating with said subscriber's line and said demodulation circuit does not receive said second data signal indicative of said inhibition of using said subscriber's line, wherein said modulation circuit transmits said first data signal toward another one of said telephone apparatus and said demodulation circuit receives said second data signal from said another one of said telephone apparatus.

* * * * *